(12) United States Patent
Meuronen

(10) Patent No.: US 6,597,917 B1
(45) Date of Patent: Jul. 22, 2003

(54) MOBILE COMMUNICATION SYSTEM WHICH TRANSMITS MESSAGING MESSAGES

(75) Inventor: Timo Meuronen, Espoo (FI)

(73) Assignee: Nokia Networks Oy, Espoo (FI)

( * ) Notice: Subject to any disclaimer, the term of this patent is extended or adjusted under 35 U.S.C. 154(b) by 254 days.

(21) Appl. No.: 09/614,724

(22) Filed: Jul. 12, 2000

Related U.S. Application Data

(63) Continuation-in-part of application No. PCT/FI99/00013, filed on Jan. 11, 1999.

(30) Foreign Application Priority Data

Jan. 13, 1998 (FI) .................................................. 980051

(51) Int. Cl.⁷ ................................................ H04Q 7/20
(52) U.S. Cl. ........................ 455/466; 455/410; 455/411
(58) Field of Search ................................ 455/410, 411, 455/465

(56) References Cited

U.S. PATENT DOCUMENTS

| | | | | |
|---|---|---|---|---|
| 4,507,781 A | * | 3/1985 | Alvarez, III et al. | 370/104 |
| 5,276,737 A | * | 1/1994 | Micali | 380/30 |
| 5,335,265 A | | 8/1994 | Cooper | |
| 5,440,758 A | | 8/1995 | Grube | |
| 5,634,197 A | | 5/1997 | Paavonen | |
| 5,689,651 A | * | 11/1997 | Lozman | 395/237 |
| 5,691,742 A | * | 11/1997 | O'Connor et al. | 271/116 |
| 5,878,397 A | * | 3/1999 | Stille et al. | 455/466 |
| 6,091,958 A | * | 7/2000 | Bergkvist et al. | 514/535 |
| 6,208,870 B1 | * | 3/2001 | Lorello et al. | 455/466 |

FOREIGN PATENT DOCUMENTS

EP 0 689 368 A1 12/1995

* cited by examiner

*Primary Examiner*—Lee Nguyen
*Assistant Examiner*—Danh Le
(74) *Attorney, Agent, or Firm*—Pillsbury Winthrop LLP

(57) ABSTRACT

The object of the invention is to provide a method and an apparatus implementing the method which allow the subscriber to evaluate the authenticity of sender data in an incoming messaging message. Messaging centers are arranged to add an indication containing information on whether the identity of the sender of a message transmitted by the messaging center is guaranteed to data units containing a messaging message. If the data unit containing the messaging message comprises said indication, the subscriber's terminal indicates the information included in the indication to the subscriber.

10 Claims, 3 Drawing Sheets

MOBILE COMMUNICATION SYSTEM WHICH TRANSMITS MESSAGING MESSAGES

RELATED APPLICATIONS

This is a continuation-in-part (CIP) of International PCT Application PCT/FI99/00013, filed on Jan. 11, 1999.

BACKGROUND OF THE INVENTION

The invention relates to mobile communication systems and particularly to a method of producing a messaging message in a mobile communication system and an apparatus implementing the method. The method comprises the steps in which a data unit containing a messaging message is sent from a messaging center to a terminal and the received messaging message is indicated by means of the terminal.

In addition to normal speech and data connections set up on the traffic channels in digital mobile communication systems, short digital data messages (messaging messages), transferred on the control and signaling channels of the system, may be sent amid actual signaling. These messages are generally called short messages. A short message service center, or generally messaging center, is typically added to a mobile communication system for producing short messages. The short message service center forwards short messages as well as stores and retransmits messages whose delivery has failed. The short message service center can be arranged to receive short messages via any network. Thus the center functions as a gateway to and from the other network. In the case of a terminal-originating short message the subscriber creates the short message using the terminal's keyboard, and the terminal sends the short message on a signaling channel to the short message service center via the base station and mobile switching center. The short message service center transmits the short message on signaling channels via the mobile communication network to another subscriber's terminal or to another destination.

The address of the element that has sent a short message is displayed to a subscriber who has received the short message in the message, the address being typically the sender's MS-ISDN number. In a way, the number functions as the signature of the message and allows the receiver to conclude the identity of the message's sender. In some less advanced short message service centers the sender's number can be processed through an application program interface, and thus the system enables sending of short messages using a wrong identity.

In some short message service centers, such as NOKIA SMSC, it is impossible to forge the sender's identity. However, since the subscriber can receive messages from several different short message service centers, in which the routines of checking the quality may differ considerably, there is a clear need for improving identification of the sender of a short message.

Sender identification is extremely important in any kind of communication. The use of a wrong identity enables misleading and disruptive communication, which may in certain cases be highly detrimental to the receiver. Since the number and selection of services provided for the subscriber via short messages increases constantly, more and more attention should be paid to the prevention of misuse.

BRIEF DESCRIPTION OF THE INVENTION

The object of the invention is to provide a method and an apparatus implementing the method which allow a subscriber to evaluate the authenticity of sender data in an incoming messaging message.

The objects of the invention are achieved with a method of producing a messaging message in a mobile communication system comprising the steps in which a data unit containing a messaging message is sent from a messaging center to a terminal and the received messaging message is indicated by means of the terminal. In the method an indication containing information on whether the identity of the sender of a message sent via the messaging center is guaranteed is added to the data unit containing the messaging message, and the indication's information on whether the identity of the sender of the message sent via the messaging center is guaranteed is indicated to the subscriber in response to the fact that the data unit containing the messaging message comprises said indication.

The invention also relates to a mobile communication system which transmits messaging messages the system comprising at least one messaging center (gateway) for transmitting messaging messages and one or more terminals for indicating messaging messages. The messaging center is arranged to add an indication containing information on whether the identity of the sender of the message sent via the messaging center is guaranteed to said data unit containing the messaging message, and the terminal is arranged to indicate the indication's information on whether the identity of the sender of the message sent via the messaging center is guaranteed to the subscriber in response to the fact that the data unit containing the messaging message comprises said indication.

The invention further relates to a messaging center functioning in a mobile communication system which messaging center is arranged to add an indication containing information on whether the identity of the sender of the message sent via the messaging center is guaranteed to said information unit containing the messaging message.

In addition, the invention relates to a terminal in a mobile communication system the terminal comprising means for receiving messaging messages. The terminal is arranged to indicate the indication's information on whether the identity of the sender of the message sent via the messaging center is guaranteed or not to the subscriber in response to the fact that the data unit containing the messaging message comprises said indication.

The preferred embodiments of the invention are disclosed in the dependent claims.

The invention is based on the idea that messaging centers are arranged to add an indication containing information on whether the function of the messaging center is guaranteed or not in respect of the sender's identity to the data unit containing the messaging message. If the sender's identity can be for example manipulated through an application program interface, the messaging center cannot be considered protected. If the identity of the sender of messaging messages delivered via a messaging center can be guaranteed in each case, the messaging center can be considered protected. Said indication can be produced in a manner which can be selected on the basis of the application. Some of these ways will be described in greater detail in the following, without restricting the invention to these embodiments.

The method and system of the invention have the advantage that they provide the subscriber with an easy way of evaluating the authenticity of the sender data in an incoming messaging message.

BRIEF DESCRIPTION OF THE DRAWINGS

The invention will be described in greater detail by means of preferred embodiments with reference to the accompanying drawings, in which.

DETAILED DESCRIPTION OF THE INVENTION

In the following, the invention will be described using the short message service of the GSM system (Global System for Mobile Communications) as an example. However, the invention is not restricted to the GSM system or messaging services functioning with GSM service but may be applied in other systems employing a messaging service, for example in systems according to the DCS1800 (Digital Communication System), PCN (Personal Communication Network) and TETRA (Trans-European Trunked Radio) standards and in the third generation mobile communication systems that are under development.

Figure 1:
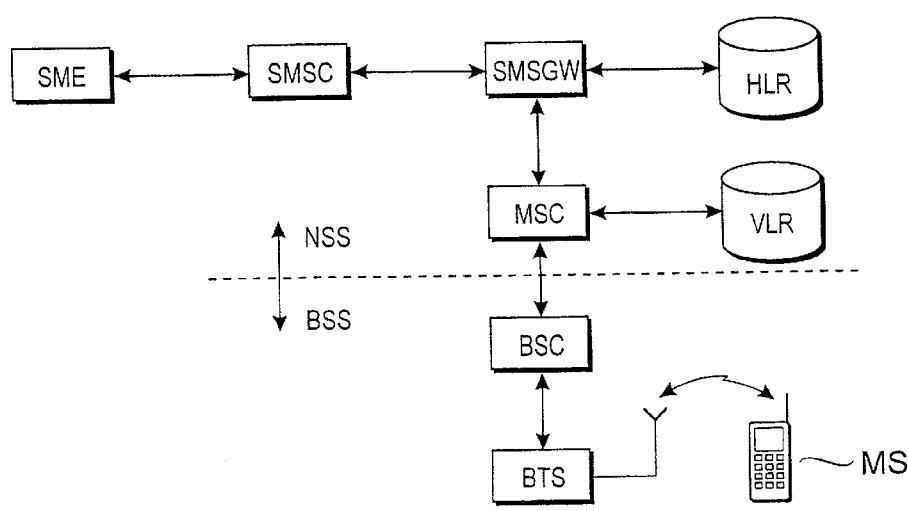
FIG. 1 illustrates basic structural parts of the GSM system which participate in delivering a mobile-terminating short message according to the prior art.

FIG. 1 illustrates the basic structural parts of the GSM system which participate in the delivery of a mobile-terminating short message. The structure of the GSM network consists of two parts: a base station subsystem BSS and a network subsystem NSS. The BSS and mobile stations MS communicate using radio connections. The operation of a mobile station according to the invention is explained more closely in connection with FIG. 2. In the base station subsystem BSS each cell is served by a base transceiver station BTS. The base transceiver stations BTS are usually connected to a base station controller BSC as groups of several base transceiver stations. The base station controller controls the radio frequencies and radio channels used by the base transceiver station BTS. The base station controllers BSC are connected to a mobile switching center MSC, which switches calls in which at least one mobile station MS is involved. Some mobile switching centers MSC are connected to other telecommunications networks (not shown in the figure), such as the public switched telephone network PSTN, and they comprise connection functions for switching calls to and from these networks. In the short message service the mobile switching center MSC transmits a short message it has received either to a mobile station MS or to a short message service center SMSC.

Two types of data bases are involved in call routing. One of these is called a home location register HLR, in which data on each subscriber in the network is stored either permanently or semi-permanently, including information on the services to which the subscriber has access and the subscriber's present location. The other data base is called a visitor location register VLR. The visitor location register VLR is usually connected to one mobile switching center MSC, but it may also serve several centers. When a mobile station MS is active (i.e. it is registered with a network and may initiate or receive a call), most of the subscriber data on the mobile station MS in the home location register HLR are loaded (copied) to the visitor location register VLR of the mobile switching center MSC in whose area the mobile station MS is. The home location register and visitor location register are used for routing short messages in a mobile communication network substantially in the same way as for routing calls.

For the short message service the system comprises a short message serving center SMSC and a short message service gateway SMSGW. More generally, the messaging center according to the invention can be embodied by any messaging center and/or messaging gateway.

The short message service center SMSC will be described in greater detail later in connection with FIG. 3. The short message service gateway SMSGW is the common name for a center transmitting short messages to a mobile station (the gateway mobile switching center for short message service) SMS-GMSC and a center transmitting mobile-originating short messages (inter-working mobile switching center for short message service) SMS-IWMSC. The SMS-GMSC receives a short message from the short message service center SMSC, requests routing information from the home location register HLR and transmits the short message to a mobile station MS via the mobile switching center MSC. Correspondingly, the SMS-IWMSC may receive short messages from the mobile station and transmit them further to the short message service center SMSC.

The short message entity SME may be any device by means of which short messages can be sent and/or received. The short message entity may be located in a mobile station, short message service center or in a fixed network.

Short messages are transmitted on the control channel, i.e. the signaling channel, amid actual signaling. The GSM system uses either a stand alone dedicated control channel SDCCH or a slow associated control channel SACCH for transmitting short messages. The last-mentioned is used when the mobile station has a connection on the traffic channel, in other words the mobile station is engaged in a call, for example.

Figure 2:
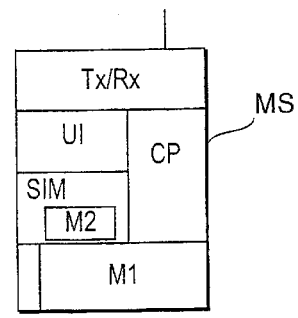
FIG. 2 is a block diagram illustrating a mobile station MS according to the prior art.

FIG. 2 is a block diagram illustrating a mobile station MS of the invention. In the GSM system the mobile station consists of the actual terminal and of a subscriber identity module SIM, which is attached to the mobile station so that it can be removed. The SIM card used as the subscriber identity module in the GSM system is a smart card which is to be inserted into a mobile station and contains data on identification of a subscriber, such as international mobile subscriber identity number IMSI and a certain amount of memory M2 for storing short messages received by the mobile station. The actual terminal comprises a transceiver Tx/Rx and its antennas, user interface UI, controller CP and memory M1, a certain amount of which is reserved for storing short messages. Thus the memory of the mobile station comprises two parts, i.e. the memory M1 of the terminal and the memory M2 of the SIM card.

The user interface UI usually comprises a keyboard, display, loudspeaker and microphone, which are not shown in FIG. 2. By means of the user interface UI the user may write, send, read, delete and rewrite short messages and give other directions to the controller CP.

The controller CP receives e.g. the above-mentioned inputs related to short messages from the user interface. The controller CP may indicate to the mobile MS user that the mobile station has received a short message via the user interface UI by a signal and by a message or a symbol which appears on the display. The controller CP may also give signals, textual instructions or instruction symbols related to the operation of the mobile station and/or the mobile communication system to the mobile subscriber via the user interface.

Figure 3:
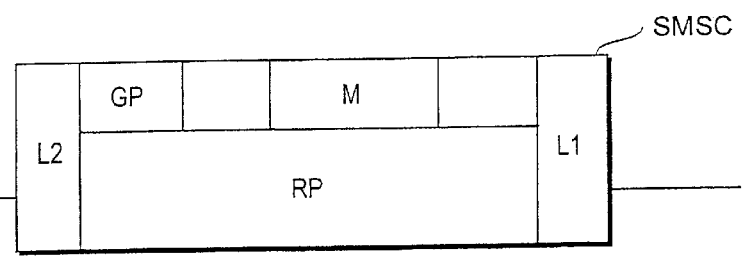
FIG. 3 is a block diagram illustrating a short message service center SMSC according to the prior art.

FIG. 3 is a block diagram illustrating a short message service center SMSC of the invention. The short message service center SMSC comprises an interface part L1 for receiving and sending short messages via the short message service gateway SMSGW from/to a mobile station in a mobile communication system. The short message service center SMSC may comprise interface parts L2 (only one of these is shown in the figure) for connecting the short message service center to other networks, such as PSTN, and/or to answering services connected directly to the short message service center. These interface parts are used for sending and receiving short messages or other messages, such as e-mail messages, from which short messages are formed or which are formed from short messages in the corresponding interface parts L1, L2. In addition, the short message service center comprises a transfer part RP which transfers the short message received by the short message service center SMSC for further delivery. The transfer part RP also stores a short message which could not be delivered in its memory M and retrieves it according to the directions from the memory when the delivery of the short message succeeds. Furthermore, the short message service center may comprise a message generation part GP for generating short messages according to the directions received from the answering service, for example.

Figure 4:
FIG. 4 illustrates a protocol architecture used in transferring short messages according to the GSM specifications and also provides a detailed view of some elements used for describing the embodiment.
Figure 4:
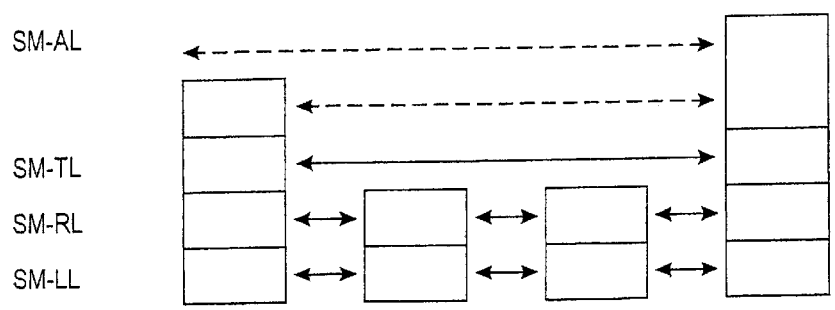

FIG. 4 illustrates a protocol architecture used for transferring short messages according to the GSM specifications and also provides a detailed view of some elements used for describing the embodiment. In the GSM system, the short message transfer layer protocol SM-TP is a protocol related to the TL layer between the short message service center SMSC and the mobile station MS. The SMS-DELIVER data unit (Transfer Protocol Data Unit, TDPU) of this protocol transfers a short message from the short message service center to the mobile station, and the SMS-SUBMIT data unit correspondingly transfers the short message from the mobile station to the short message service center. The SMS-DELIVER data unit substantially comprises a UD basic element (User Data), which transmits the actual short message. In the solution of the invention identity information is included in the data unit to be transferred in the form of a short message, and the information is transmitted to the mobile station MS in the short message. On the basis of said identity information the terminal may provide the subscriber with indication of whether the short message originates from a short message service center in which the message's original sender cannot be manipulated.

Figure 5:
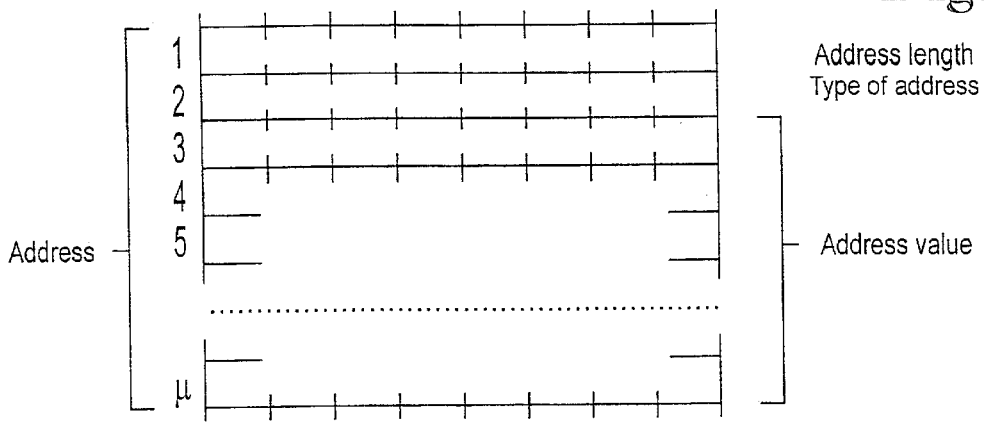
FIG. 5 illustrates the structure of a TP-OA element.

The SMS-DELIVER data unit comprises a TP-OA basic element which consists of 2 to 12 bit octets and includes the address of the short message entity that has sent the short message. FIG. 5. illustrates the structure of the TP-OA element (TP-Originating-Address) which comprises the following parts: address length, type of address and address value. The address length is an integer which is expressed with one bit octet and indicates the length of the Address Value field.

Figure 6:
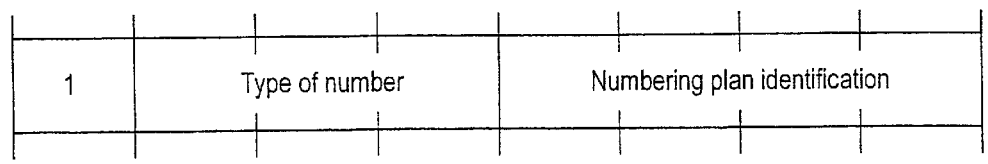
FIG. 6 illustrates the structure of an address type.

From the structure of the address type illustrated in FIG. 6 it appears that this element comprises a Type of Number field with a length of three bits and a Numbering Plan Identification field with a length of four bits. There are several bit combinations defined for each field, and on the basis of these combinations the number data included in the Address Value field of the source address can be interpreted.

The present invention is based on the idea that an identifier which indicates to the receiver of a short message whether the identity of the sender of the incoming message is guaranteed or not is added to the data unit which transfers the short message. In the preferred embodiment of the invention the identifier consists of a bit or a bit map which is defined for and added to the Type of Number field or Numbering Plan Identification field and reserved particularly for this purpose. Only the short message service centers SMSC that do not allow to manipulate the identity of the sender of the short message sent by them can incorporate said bit map into said field.

A message sent by the short message service center SMSC is transferred to the mobile communications network via the short message service center gateway SMS-GMSC and further to the terminal MS over the radio interface. The terminal receives a data unit by means of the transceiver Tx/Rx, and the unit is transferred to the terminal controller CP. According to the invention, the terminal MS, preferably its controller CP, is arranged to identify said bit map from the Type of Address field and to control the operation of the terminal according to the identification. The way in which the indication is provided for the subscriber is an application-specific solution and may be selected separately for each terminal. The controller CP may be arranged to control the display included in the user interface UI so that it shows a certain symbol to the subscriber. The subscriber can conclude from this symbol whether the message sender's identity is guaranteed or not. Thus the subscriber may decide separately in each case whether he should doubt the authenticity of the message. The indication may also be a deviating signal for short message or a verbal indication which is shown on the display together with the message (e.g. "SUBSCRIBER NOT GUARANTEED"). The indication may also be an additional function of the terminal MS, which an educated subscriber and/or a subscriber who uses the short message service frequently may optionally utilize in his terminal.

The embodiment described above employed a bit map included in the TP-OA basic element as the identifier. The selection of the identifier is an application-specific solution which can be implemented in the chosen manner. In the GSM system, for example, the identifier may be implemented in the same way by defining a bit map either for a PID basic element (TP-Protocol Identifier) or for the user data header of the UD basic element (User Data). It is essential that the identifier is included in the data unit that transmits the short message and is thus transferred to the terminal MS in the data unit, the terminal being arranged to recognize the identifier and to operate in the manner indicated by the identifier.

Figure 7:
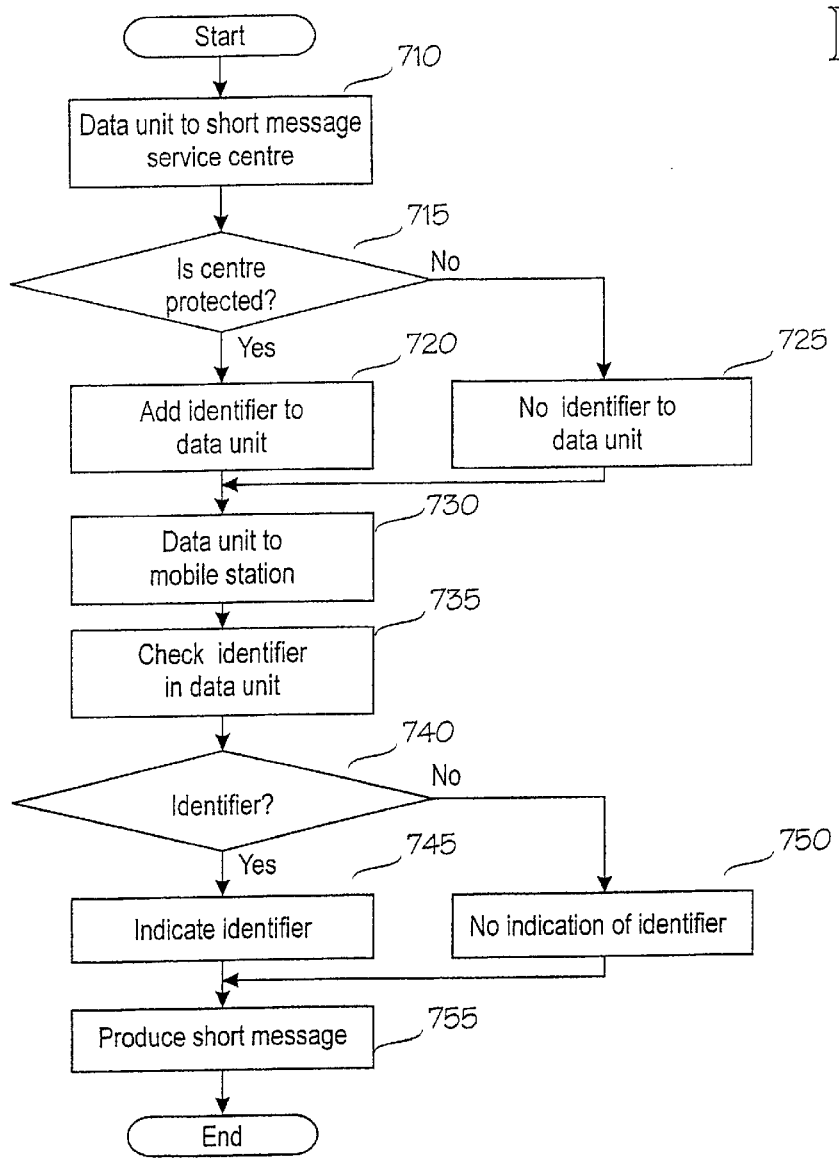
FIG. 7 is a flow chart illustrating the method of the invention.

The flow chart of FIG. 7 illustrates the method of the invention. In step 710 the short message service center SMSC receives a data unit containing a short message. If the short message service center SMSC is a protected short message service center (step 715), in other words, the sender's address received via the center cannot be manipulated by the sender, the center can add an identifier indicating the center's reliability level to the data unit containing the short message (step 720). If the center is not protected, an identifier cannot be added to the data unit (step 725). After this, the data unit containing the short message is delivered to the terminal in the usual manner (step 730). The terminal's controller CP checks whether the received data unit contains an identifier indicating protection (step 740). If the identifier is found, the control unit can indicate that the short message service center that has sent the incoming message is protected by providing a symbol indicating protection on the terminal display, for example (step 745). If no identifier is found in the data unit, protection cannot be indicated (step 750). After this, the short message function continues in the usual manner (step 755). Indication of protection does not need to be a separate function but it may also be implemented in connection with the display of a short message.

Figure 8:
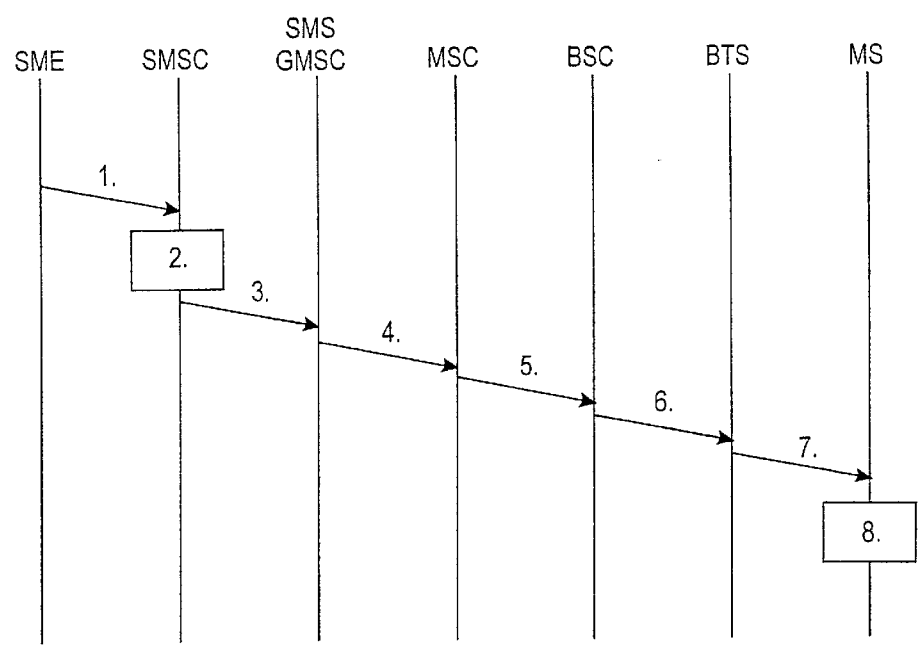
FIG. 8 is a signaling chart illustrating a short message function according to the invention.

The signaling chart illustrated in FIG. 8 describes implementation of the method of the invention in connection with the short message function. Signal 8.1. represents a data unit which contains a short message and is transferred to the short message service center SMSC by the short message entity SME. In the GSM environment described above the data unit is the SMS-SUBMIT message of the Transfer Protocol layer. In step 8.2 the protected short message service center SMSC adds an identifier indicating protection to the data unit. The identifier can be produced for example by means of the bit map arranged in the TP-OA element, as was described above. After this, the delivery of the short message continues in the manner described above through the mobile communication network (signals 8.3 to 8.7). When the data unit enters the terminal MS, the terminal's control unit checks whether the data unit contains the selected identifier indicating that the short message service center is protected. If the data unit contains the identifier and the subscriber's terminal allows indication, the subscriber is informed of the fact that the short message service center SMSC that has sent the message is protected.

In the above examples the identifier is added to the short message service centers that can guarantee the identity of the sender of the short message. However, it could also be defined that an identifier is added to data units containing a short message only in such short message service centers that cannot guarantee the sender's identity, in which case indication would naturally show that the short message originates from a short message service center which cannot guarantee the sender's identity.

It should be understood that the above description and the related drawings are only intended to illustrate the present invention. Thus it is obvious to a person skilled in the art that the invention may be varied and modified in different ways without deviating from the scope and inventive concept disclosed in the appended claims.

What is claimed is:

1. A method of producing a messaging message in a mobile communication system comprising a message center, the method comprising:

receiving, at the message center, information from a sending party, wherein the information comprises the sending party's identity and it is intended for a receiving party, formatting the information as a messaging message and transmitting the messaging message from the message center to the receiving party, providing the messaging message with an indication as to whether or not the sending party's identity was able to be guaranteed;

based on the indication, informing the receiving party as to whether or not the sending party's identity was able to be guaranteed, wherein said indication comprises one of the following:
      a selected bit combination included in a TP-Originating Address basic element, a selected bit combination included in the Type of Address structural part of the TP-Originating Address basic element or a selected bit combination included in the Numbering Plan Identification structural part of the TP-Originating Address basic element.

2. A method of producing a short message in a mobile communication system comprising a short message service center; the method comprising:

receiving, at the short message service center, information from a sending party, wherein the information comprises the sending party's identity and it is intended for a receiving party, formatting the information as a short message and transmitting the short message from the short message service center to the receiving party, providing the short message with an indication as to whether or not the sending party's identity was able to be guaranteed;

based on the indication, informing the receiving party as to whether or not the sending party's identity was able to be guaranteed wherein said indication comprises one of the following:
      a selected bit combination included in a TP-Originating Address basic element, a selected bit combination included in the Type of Address structural part of the TP-Originating Address basic element or a selected bit combination included in the Numbering Plan Identification structural part of the TP-Originating Address basic element.

3. A mobile communication system which transmits messaging messages and comprises at least one message center for transmitting messaging messages and one or more terminals for indicating messaging messages, comprising the message center arranged to add an indication containing information on whether the identity of the sender of a message sent via the message center is guaranteed to a data unit containing the messaging message; and the terminal arranged to use the indication for informing the receiving party as to whether or not the identity of the sender of the message sent via the message center is guaranteed wherein said indication comprises one of the following:
      a selected bit combination included in a TP-Originating Address basic element, a selected bit combination included in the Type of Address structural part of the TP-Originating Address basic element or a selected bit combination included in the Numbering Plan Identification structural part of the TP-Originating Address basic element.

4. A mobile communication system which transmits short messages and comprises at least one short message service center for transmitting short messages and one or more terminals for indicating short messages, comprising the short message service center arranged to add an indication containing information on whether the identity of the sender of a message sent via the short message service center is guaranteed to a data unit containing the short message; and the terminal arranged to use the indication for informing the receiving party as to whether or not the identity of the sender of the message sent via the short message service center is guaranteed wherein said indication comprises one of the following:
      a selected bit combination included in a TP-Originating Address basic element, a selected bit combination included in the Type of Address structural part of the TP-Originating Address basic element or a selected bit combination included in the Numbering Plan Identification structural part of the TP-Originating Address basic element.

5. A messaging center adapted to function in a mobile communication system which messaging center is adapted to receive information from a sending party, wherein the information comprises the sending party's identity and to format the information as a messaging message and transmitting the messaging message from the message center to the receiving party, the messaging center being further adapted to add an indication containing information on whether the identity of the sender of a message sent via the messaging center is guaranteed to said data unit containing the messaging message wherein said indication comprises one of the following:
a selected bit combination included in the TP-Originating Address basic element, a selected bit combination included in the Type of Address structural part of the TP-Originating Address basic element or a selected bit combination included in the Numbering Plan Identification structural part of the TP-Originating Address basic element.

6. A short message service center adapted to function in a mobile communication system which short message service center is further adapted to receive information from a sending party, wherein the information comprises the sending party's identity and to format the information as a messaging message and transmitting the messaging message from the message center to the receiving party, the messaging center being further adapted to add an indication containing information on whether the identity of the sender of a message sent via the short message service center is guaranteed to said data unit containing the short message wherein said indication comprises one of the following:
a selected bit combination including a TP-Originating Address basic element, a selected bit combination included in the Type of Address structural part of the TP-Originating ddress basic element or a selected bit combination included in the Numbering Plan Identification structural part of the TP-Originating Address basic element.

7. A terminal in a mobile communication system, the terminal comprising means for receiving messaging messages and being adapted to indicate the indication's information on whether the identity of the sender of the message sent via the messaging center is guaranteed to the subscriber in response to the fact that the data unit containing the messaging message comprises said indication wherein said indication comprises one of the following:
a selected bit combination including a TP-Originating Address basic element, a selected bit combination included in the Type of Address structural part of the TP-Originating Address basic element or a selected bit combination included in the Numbering Plan Identification structural part of the TP-Originating Address basic element.

8. A terminal in a mobile communication system, the terminal comprising means for receiving short messages and being adapted to indicate the indication's information on whether the identity of the sender of the message sent via the short message service center is guaranteed to the subscriber in response to the fact that the data unit containing the short message comprises said indication where said indication comprises one of the following:

a selected bit combination including a TP-Originating Address basic element, a selected bit combination included in the Type of Address structural part of the TP-Originating Address basic element or a selected bit combination included in the Numbering Plan Identification structural part of the TP-Originating Address basic element.

9. A terminal according to claim 8 wherein the indication is a symbol which is provided on the display of the terminal.

10. A terminal according to claim 8 or 9 wherein said indication is an optional additional function.

* * * * *